United States Patent [19]

Lansberry

[11] Patent Number: 5,767,637
[45] Date of Patent: Jun. 16, 1998

[54] CONTROLLER FOR TURBOALTERNATOR

[75] Inventor: Geoffrey B. Lansberry, Cambridge, Mass.

[73] Assignee: Chrysler Corporation, Auburn Hills, Mich.

[21] Appl. No.: 641,967

[22] Filed: May 2, 1996

[51] Int. Cl.$^6$ .................................................. H02P 5/70
[52] U.S. Cl. ...................... 318/146; 318/150; 318/151; 318/157; 180/65.2; 180/65.4; 290/14
[58] Field of Search ...................... 180/65.1, 65.2, 180/65.3, 65.8, 301–305, 165; 318/140–158; 290/829

[56] References Cited

U.S. PATENT DOCUMENTS

| | | | |
|---|---|---|---|
| 4,444,285 | 4/1984 | Stewart et al. | 180/65.4 |
| 4,495,451 | 1/1985 | Barnard | 318/150 |
| 4,533,011 | 8/1985 | Heidemeyer et al. | 180/65.2 |
| 4,631,456 | 12/1986 | Drescher et al. | 318/140 |
| 4,900,962 | 2/1990 | Hockney et al. | 310/90.5 |
| 4,961,352 | 10/1990 | Downer et al. | 74/5.46 |
| 5,172,784 | 12/1992 | Varela, Jr. | 180/65.4 |
| 5,255,733 | 10/1993 | King | 180/65.3 |
| 5,291,975 | 3/1994 | Johnson et al. | 188/378 |
| 5,318,142 | 6/1994 | Bates et al. | 180/65.2 |
| 5,319,273 | 6/1994 | Hockney et al. | 318/632 |
| 5,327,987 | 7/1994 | Abdelmalek | 180/65.2 |
| 5,345,761 | 9/1994 | King et al. | 180/65.3 |
| 5,353,656 | 10/1994 | Hawkey et al. | 74/5.41 |
| 5,396,140 | 3/1995 | Goldie et al. | 310/268 |
| 5,415,245 | 5/1995 | Hammond | 180/165 |
| 5,442,288 | 8/1995 | Fenn et al. | 324/244 |
| 5,465,015 | 11/1995 | Anastas et al. | 310/26 |

OTHER PUBLICATIONS

Popular Science Magazine. Emerging Technologies for the Supercar, Jun. 1994.
NASA Tech Briefs, The Digest of New Technology, Jun. 1995, vol. 19, No. 6, pp. 12 and 13.

Primary Examiner—David S. Martin
Attorney, Agent, or Firm—Mark P. Calcaterra

[57] ABSTRACT

A speed controller for a generator having a rotor includes a speed control input port for receiving a speed command signal, a proportional gain stage electrically connected to said speed control input port for amplifying the speed command signal to create an amplified signal, a turbine speed integrator operatively connected to the speed control input port for integrating the speed control signal to create an integrated signal, an adder for adding the amplified signal and the integrated signal to create a torque signal, a speed estimator for estimating the rotational speed of the rotor of the generator whereafter the speed estimator generates a rotational speed signal and a multiplier electrically connected to the adder and the speed estimator to multiply the rotational speed signal and the torque signal to create a power signal to be output by the speed controller.

1 Claim, 4 Drawing Sheets

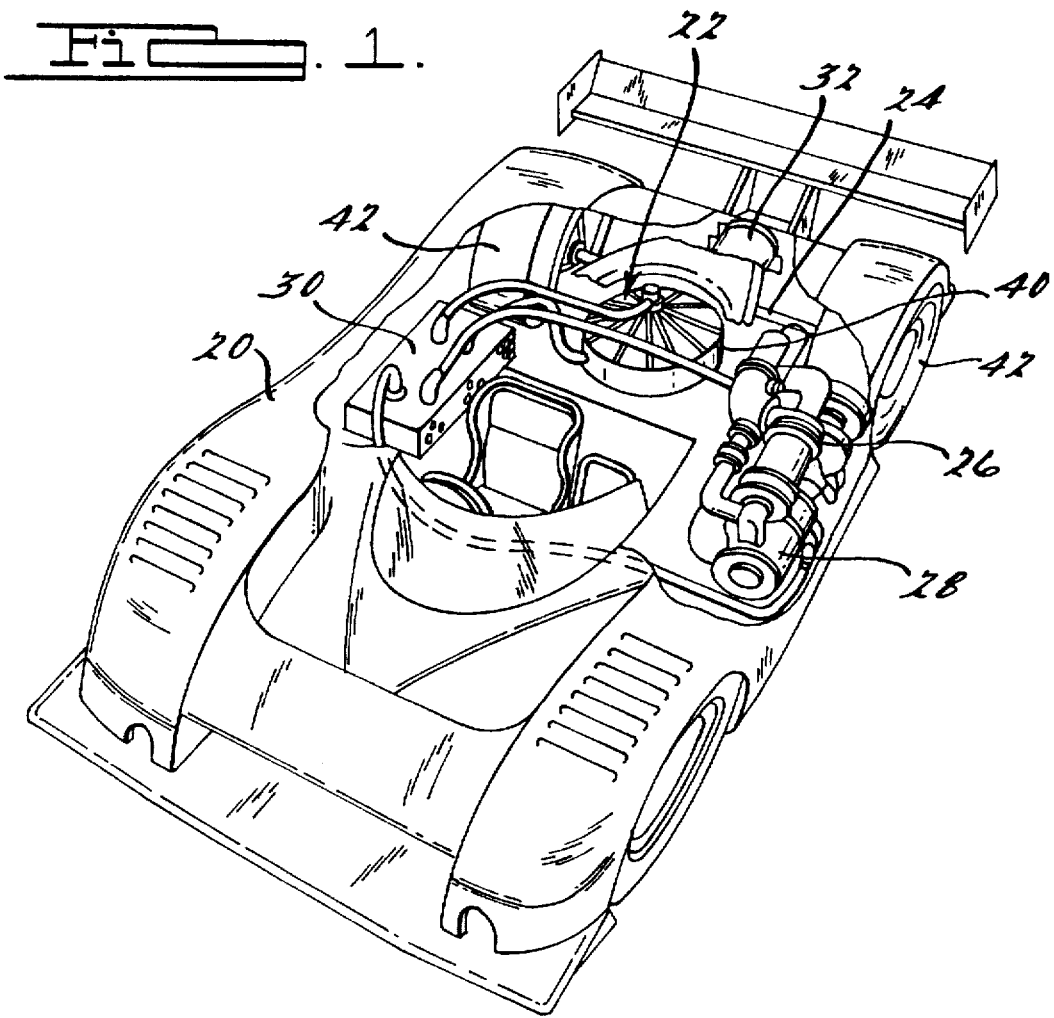
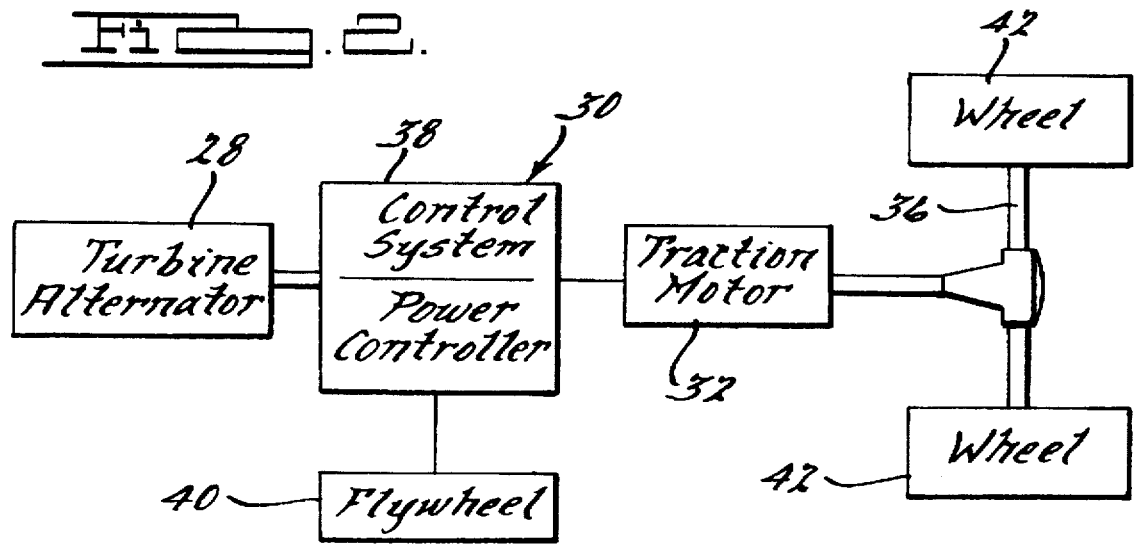

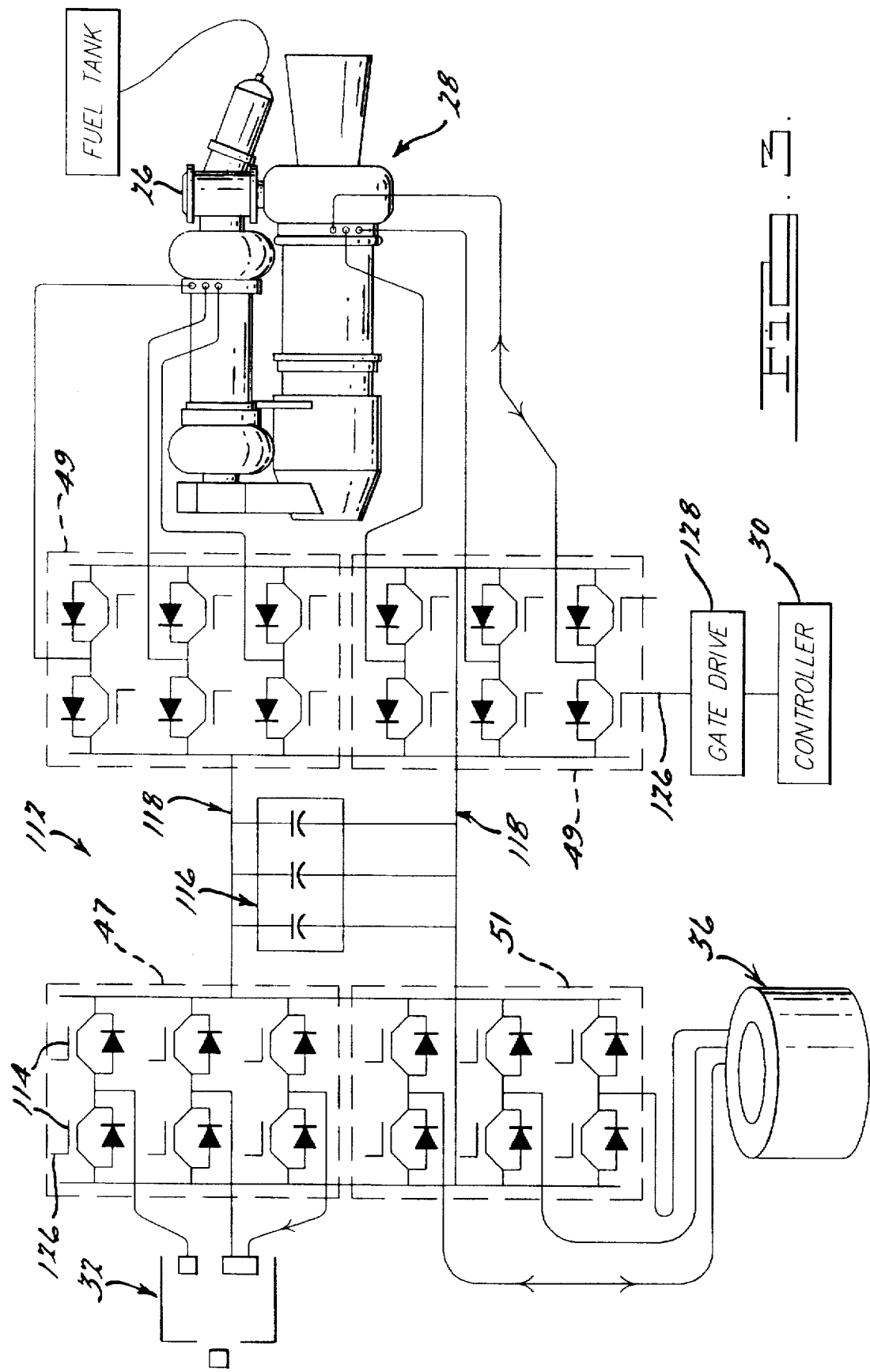

CONTROLLER FOR TURBOAL TERNATOR

BACKGROUND OF THE INVENTION

1. Field of the Invention

The present invention relates generally to powertrain systems in vehicles, and, more particularly, to a hybrid powertrain system in an automotive vehicle.

2. Description of the Related Art

Since the invention of power vehicles, many different powertrain systems have been attempted, including a steam engine with a boiler or an electric motor with a storage battery. It was, however, the four-stroke internal combustion engine invented by Otto in 1876, and the discovery of petroleum in 1856 that provided the impetus for the modern automotive industry.

Although gasoline emerged as the fuel of choice for automotive vehicles, recent concerns regarding fuel availability and increasingly stringent federal and state emission regulations have renewed interest in alternative fuel powered vehicles. For example, alternative fuel vehicles may be powered by methanol, ethanol, natural gas, electricity or a combination of fuels.

A dedicated electric powered vehicle offers several advantages: electricity is readily available; an electric power distribution system is already in place; and an electric powered vehicle produces virtually zero emissions. There are several technological disadvantages that must be overcome before electric powered vehicles gain acceptance in the marketplace. For instance, the range of an electric powered vehicle is limited to approximately 100 miles, compared to about 300 miles for a gasoline powered vehicle. Further, the acceleration is about half that of a similar gasoline power vehicle. There is, therefore, a need in the art for a powertrain to provide an electric motor for an automotive vehicle which capable of performing as dynamically as an internal combustion engine.

SUMMARY OF THE INVENTION

It is an object of the present invention to provide an automotive vehicle.

It is another object of the present invention to provide an automotive vehicle driven by a traction motor.

It is yet another object of the present invention to provide an automotive vehicle driven by a traction motor having a power controller controlling a hybrid powertrain of an automotive vehicle.

According to the foregoing objects, a speed controller for a generator having a rotor is disclosed having a speed control input port for receiving a speed command signal. A proportional gain stage is electrically connected to the speed control input port and amplifies the speed command signal to create an amplified signal. A turbine speed integrator is operatively connected to the speed control input port and integrates the speed control signal to create an integrated signal. An adder adds the amplified signal and the integrated signal to create a torque signal. A speed estimator estimates the rotational speed of the rotor of the generator. The speed estimator generates a rotational speed signal. A multiplier is electrically connected to the adder and the speed estimator and multiplies the rotational speed signal and the torque signal to create a power signal to be output by the speed controller.

One advantage of the present invention is the ability to electrically power a traction motor of an automotive vehicle. Another advantage of the present invention is to control the power output of a generator based on an input speed control signal generated to control the rotational speed of a rotor of the generator.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is a perspective view partially cut away of an automotive vehicle.

FIG. 2 is a block diagram of the power train for the automotive vehicle.

FIG. 3 is a diagrammatic view of the power system of an automotive vehicle.

DESCRIPTION OF THE PREFERRED EMBODIMENT(S)

Figure 4:
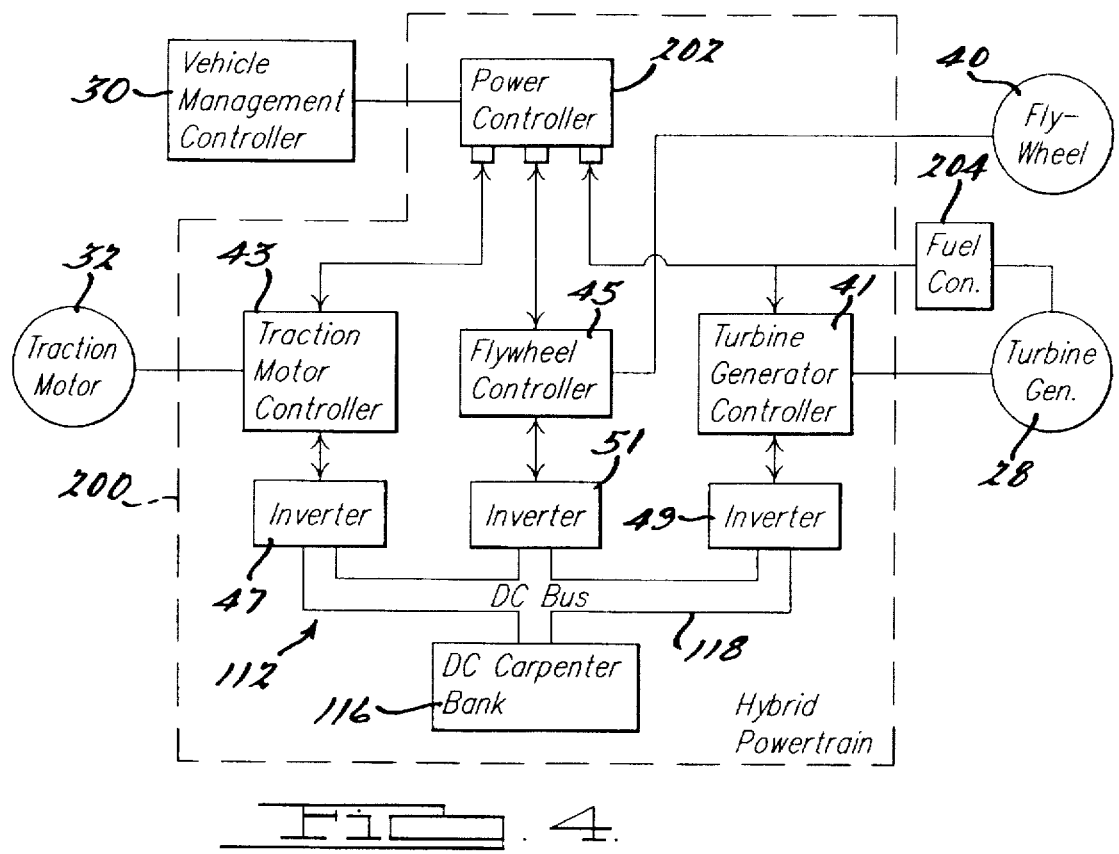
FIG. 4 is a block diagram of one embodiment of a hybrid powertrain assembly of an automotive vehicle according to the present invention.

Referring to FIGS. 1 and 2, a hybrid powertrain system is illustrated for an automotive vehicle 20. The vehicle 20 is partially shown in a cut away view illustrating a hybrid powertrain system 22 disposed within the chassis 24. The hybrid powertrain system 22 includes a gas powered generator 28, which in this example is fueled by liquefied natural gas. In one embodiment, the gas powered generator 28 is a turbine generator. The turbine generator 28 spins an alternator to generate electric power. It should be appreciated that in this example there are two alternators 28 that run at different speeds, such as 60,000 rpm and 100,000 rpm, to produce electricity equivalent to 500 horsepower. It should also be appreciated that the turbine generator 28 and the alternator may be referred to as a turboalternator.

A power or vehicle management controller 30 is in communication with the turbine generator 28a and alternator 28b having a rotating shaft 29 extending therebetween, and manages the distribution of power from the alternator 28 to a traction or induction motor 32 using a power transfer mechanism, utilizing a three phase variable frequency alternating current (VFAC). The turbine generator 28a and the alternator 28b (best seen in FIG. 6) are directly coupled through the rotating shaft 29. In this example the traction motor 32 is an AC induction traction motor 32. The traction motor 32 transfers its energy to the drive train 36 to drive the automotive vehicle 20.

Therefore, a signal from a control system 38 to accelerate the automotive vehicle 20 is communicated to the vehicle management controller 30. The vehicle management controller 30 directs the traction motor 32 to generate a specified torque and, eventually, drive to the wheels 42. If the power needed of the traction motor 32 is less than that being supplied by the turbine generator 28, the excess power capacity is absorbed into the flywheel assembly 40 for storage. If the power needed of the traction motor 32 is greater than the being supplied by the turbine generator 28 the power deficits is balanced with energy from the flywheel.

Preferably, the hybrid powertrain system 22 also includes various critically placed sensors which are conventional and well known in the art. The outputs of these sensors communicate with the vehicle management controller 30. It should also be appreciated that the automotive vehicle 20 includes other hardware not shown, but conventional in the art to cooperate with the hybrid powertrain system 20.

The peripheral machines, comprising the turbine alternator unit 28, traction motor 32 and flywheel assembly 40, are all AC machines. Power in the form of alternating current must be supplied to each induction machine 28,32, and the flywheel assembly 40 and may be generated or provided by each induction machine 28, 32 or the flywheel assembly 40. The controller 41, 43, 45 associated with each machine 28,32, 0 manipulates the power to form the necessary signals for each induction machine 28,32, and the flywheel 40 (i.e., frequency and magnitude). The power is manipulated by each of the inverters 47,49,51 the DC bus into the required AC signals.

The system 22 also includes a power unit 112, consisting of the inverters 47,49,51, DC bus and capacitor bank 112, for converting and storing power and transferring same between the induction machines 28,32 and the flywheel assembly 40 based on control signals from each controller 41,43,45.

The power unit 112 transfers power for start up of the turbine engine 28 and turbine unit 28, receives generated power from the operating turbine unit 28 for distribution at a nominal operating level, transfers power to and from the flywheel assembly 40, and transfers power to and from the traction motor 32. The vehicle management controller 30 manipulates and controls the power controller 206 to selectively transfer the power based on various operating conditions of the vehicle, and to synthesize a sinusoidal current wave form to operate the induction machines 28,32 and the flywheel assembly 40 at the desired levels. Alternating current waveforms are constructed from DC voltage by the inverters 47,49,51. For example, the power unit 112 stores DC voltage at a nominal 800 V. The turbine alternator unit 28 requires ac power signals at a nominal operating frequency 1.5–2.0 kHz, the flywheel assembly 40 requires AC power signals up to 10 kHz, and the traction motor 32 requires AC power signals at nominal operating frequency of 600–1200 Hz.

A schematic diagram of the power unit 112 is generally illustrated in FIG. 3. As illustrated, the power unit 112 includes four inverters, which are assembled from a plurality of power switches in the form of power transistors 114 connected between the induction machines 28,32 and the flywheel assembly 40 and a DC storage assembly in the form of a capacitor bank 116. The power transistors 114 switch power to each of the induction machines 28,32 and the flywheel assembly 40 from the capacitor bank 116, and also switch power from these machines to the capacitor bank 116. The capacitor bank 116 stores a DC charge at a nominal 800 V (+\-50 V). Connected between the capacitor bank 116 and the power transistors 114 is a DC bus 118 which communicates the DC power stored in the capacitor banks 116 to and from the power transistors 114. As subsequently discussed, the gates of the power transistors 114 are controlled such that synthesized AC voltage signals are sent to each of the induction machines 28,32 and the flywheel assembly 40 through pulse width modulation. In turn, AC power which is produced by the alternator unit 28 is rectified by the power transistors 114 and is supplied to the capacitor bank 116 via the DC bus 118.

Referring to FIG. 4, a hybrid powertrain assembly is generally indicated at 200. The hybrid powertrain assembly 200 receives input commands from the vehicle management controller 30 and sends output commands to the vehicle management controller 30. The signals are sent from and sent into the power controller 202. The power controller 202 controls all of the components therein, discussed subsequently. The power controller 202 also performs an orderly shut down of the hybrid powertrain assembly 200 in the event disturbances are sensed.

The DC bus 118 is a part of the hybrid powertrain assembly 200 and indirectly connected to the power controller 202. The DC bus 118 operates at a predetermined voltage level, 800 V in one embodiment. The DC bus 118 also operates within a predetermined voltage range, between 750 V and 900 V in one embodiment.

The turbine generator 28 (turbine alternator above) is connected to the DC bus 118 and the power controller 202 through the inverters 47,49,51 and the controller 41,43,45, respectfully. The turbine generator 28 generates power and is a speed regulator. The turbine generator 28 bilaterally transfers the power between the DC bus 118. The turbine generator 28 transfers this power independently of the voltage level. More specifically, the turbine generator 28 provides an output that is substantially constant as commanded by the vehicle management controller 30 once it is past a start up period. The turbine generator 28 receives power from fuel input, which is controlled by a turbine fuel controller 204. The turbine fuel controller 204 is controlled by the power controller 202. The turbine fuel controller 204 may be any standard fuel delivery system capable of performing in an automotive vehicle environment and is well known to those skilled in the art.

The traction motor 32 is connected to the DC bus 118 and the power controller 202 through a traction motor controller 41 and the inverter 47. The traction motor 32 bilaterally transfers power with the DC bus 118 independently of the voltage level. More specifically, the traction motor 32 is a torque regulator and provides power to or draws power from the DC bus 118 at a rate consistent with the specific instantaneous torque requirements. The torque requirements are not a function of the potential across the DC bus 118 and, therefore, do not depend thereon.

The flywheel assembly 40 is connected to the DC bus 118. The flywheel assembly 40 is also connected to the DC bus 18. The flywheel assembly 40 bilaterally transfers power with the DC bus 118 based on the voltage level thereof. More specifically, the flywheel assembly 40 is the voltage regulator of the hybrid powertrain assembly 200. Therefore, the flywheel assembly 40 must control the voltage potential across the DC bus 118. The flywheel assembly 40 does so by the bilateral transfers of power therebetween. Of the turbine generator 28, the traction motor 32, and the flywheel assembly 40, only the flywheel assembly 40 transfers power to and from the DC bus 118 based on the voltage potential across the DC bus 118.

The power controller 202 controls the flywheel assembly 40 so that it may accurately regulate the voltage on the DC bus 118. The power controller 202 receives information regarding the power outputs from the turbine generator 28 and the traction motor 32 through its electrical connections to the turbine generator controller 43 and the traction motor controller 41, respectively. From the power signals, the flywheel controller 51 sends commands corresponding to charging and discharging command signals to the flywheel inverter 51. As set forth herein, to charge a flywheel assembly 40 is to apply a voltage to the flywheel assembly 40 such that it may store energy therein in the form of rotational inertia. The faster the flywheel (not shown) is rotating, the more the flywheel assembly 40 is charged. Likewise, a discharging command signal will result in the discharge of energy stored by the flywheel assembly 40 by slowing the flywheel.

Returning attention to the capacitor bank 116, energy is stored therein to provide a momentary supply of current to the DC bus 118 when a command comes from the vehicle management controller 30 that an acceleration is to occur in the automotive vehicle 20. The capacitor bank 116 cannot sustain the voltage on the DC bus 118. It can, however, sustain the voltage on the DC bus 118 for the short period of time it takes for the controls of the flywheel assembly 40 to charge or discharge the flywheel assembly 40.

Figure 5:
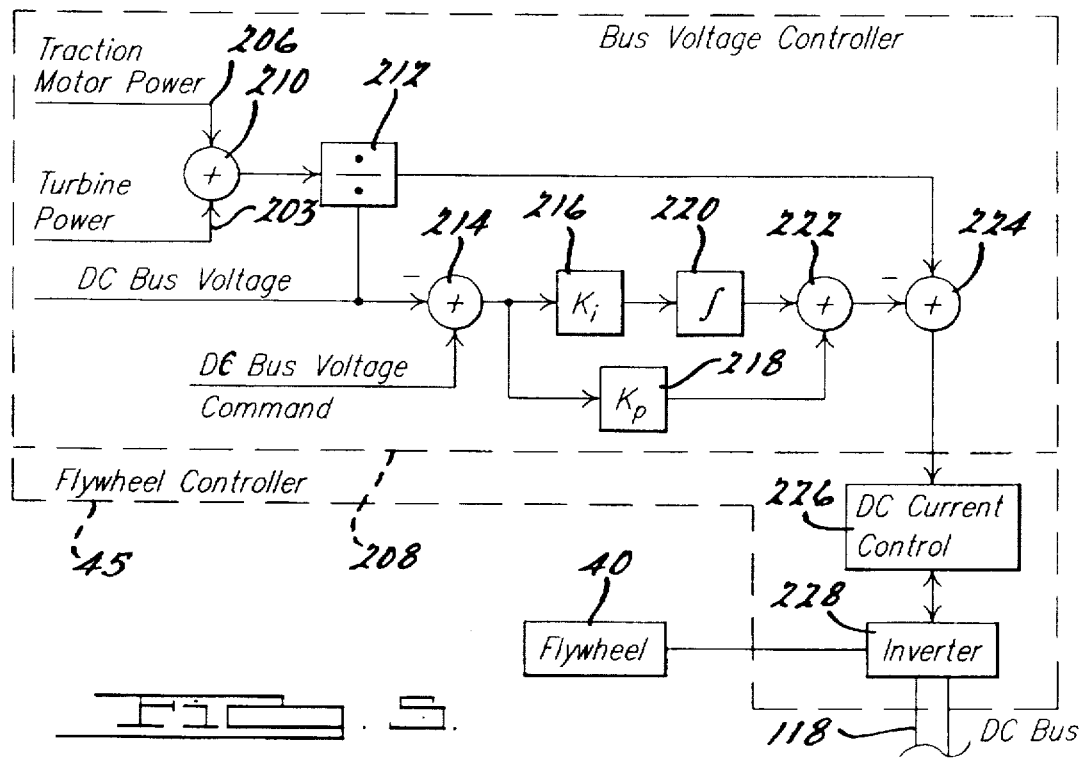
FIG. 5 is a block diagram of one embodiment of the flywheel controller of the hybrid powertrain assembly according to the present invention.

Referring to FIG. 5, the flywheel controller 45 includes a bus voltage controller 208. The bus voltage controller 208 controls the voltage across DC bus 118. The bus voltage controller 208 receives the power signals from the turbine generator 28 and the traction motor 32 through the first 203 and second 206 input ports, respectively. The input ports 203,206 are directly connected to the turbine generator controller 43 and the traction motor controller 41, respectively. Those power signals are added using an adder 210. The added signal is divided by the DC bus voltage using a divider 212. The resulting signal is a current signal. The DC bus voltage is subtracted from the DC bus voltage command by a second adder 214. This signal is sent through an integration gain stage 216 and a proportional gain stage 218. The signal which passes through the integration gain stage 216 is integrated by an integrator 220. The integrated signal and the signal amplified by the proportional gain stage 218 are added by a third adder 222. The current signal from the divider 212 is subtracted from the signal from the third adder 222 by a fourth adder 224. It is this signal that is the input to the DC flywheel current controller 226. The DC current controller is disclosed in my copending patent application (our reference 0334.00152). The signal generated here is in communication with an inverter 228, the power transistors 114 discussed above. The signals are then used to drive the flywheel assembly 40 to charge or discharge. The resulting operation is that when the net power into the DC bus is negative, the voltage on the DC bus will start to decrease. The bus voltage controller will correct for this by causing the flywheel to discharge into the bus, until the voltage returns to its commanded level. When the net power into the bus it positive, the converse occurs.

Figure 6:
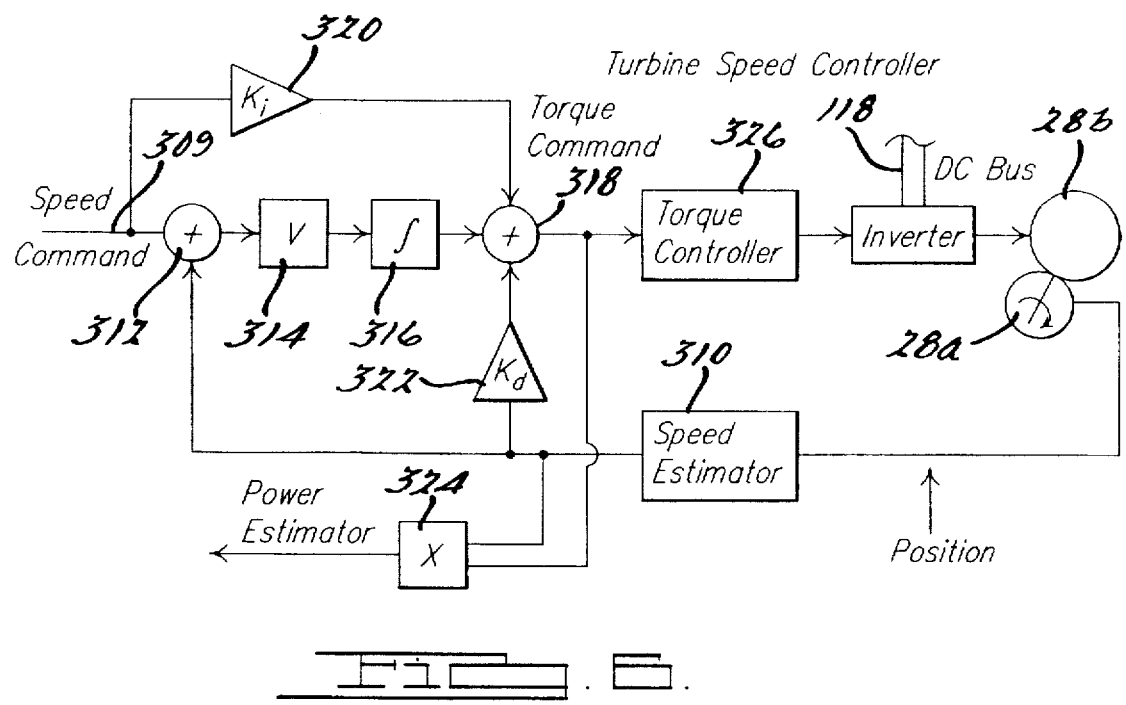
FIG. 6 is a block diagram of one embodiment of the generator controller of the hybrid powertrain assembly according to the present invention.

Referring to FIG. 6, the turbine generator controller 43 is a turbine speed controller and is shown in more detail. The turbine generator controller 43 receives a speed command signal from the power controller 202. The speed command signal is added to an output of a speed estimator 310 by a fifth adder 312. The output of the adder 312 is amplified through an integration gain stage 314, after which it is integrated by a turbine speed integrator 316. The integrated signal is added by a sixth adder 318 to the speed command signal after it has been amplified by a second proportional amplifier 320. The output of the speed estimator 310 is also amplified by an amplifier 322 and added by the sixth adder 318. The output of the sixth adder 318 is sent to a first multiplier 324 where it is multiplied by the output of the speed estimator 310. The output of the sixth adder 318 is also sent to a torque controller 326. The torque controller 326 creates voltage commands which are sent to the turbine generator inverter 49. The signal generated here is in communication with the turbine generator inverter 49, the power transistors 114, discussed above. The signals are then used to drive the turbine generator 28. The speed estimator 310 estimates the rotational speed of the turbine generator 28 at this point.

Figure 7:
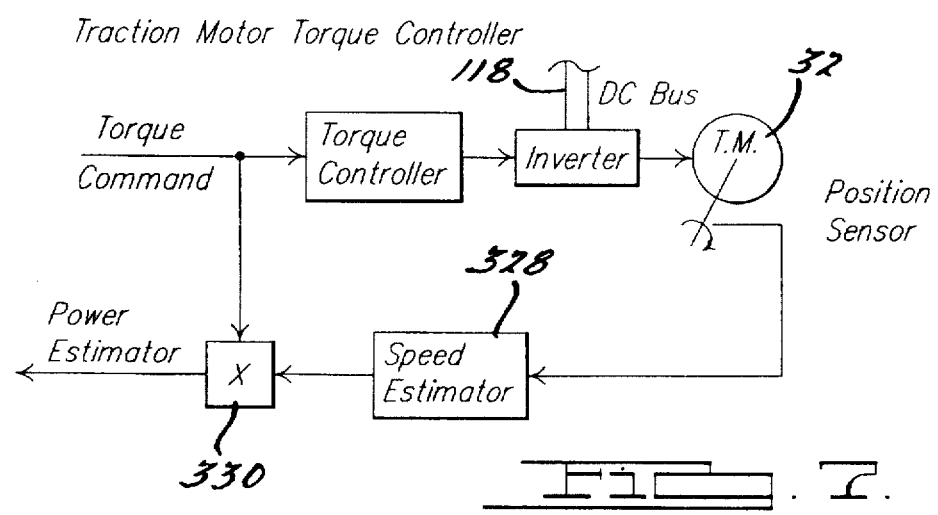
FIG. 7 is a block diagram of the traction motor controller of the hybrid powertrain assembly according to the present invention.

Referring to FIG. 7, the traction motor torque controller 41 is shown in more detail. The traction motor torque controller 41 receives a torque command from the power controller 202. The torque controller 41 sends voltage commands directly to the traction motor inverter 47. The signals are then used to drive the traction motor 32. A traction motor speed estimator 328 estimates the rotational speed of the rotor (not shown) of the traction motor 32 and sends the traction motor speed signal to a second multiplier 330. The second multiplier 330 multiplies the traction motor speed signal with the torque command from the power controller 202.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A speed controller for an alternator having a rotor with a turbine directly secured thereto to generate a torque, said speed controller comprising:

means for receiving a speed command signal defining a predetermined speed to rotate the turbine at the predetermined speed;

a proportional gain stage for receiving and amplifying the speed command signal to create an amplified signal;

a turbine speed integrator for receiving and integrating the speed command signal to create an integrated signal;

an adder for adding the amplified signal from said proportional gain stage and the integrated signal from said turbine speed integrator to create a torque signal;

a speed estimator for estimating the rotational speed of the turbine, said speed estimator generating a rotational speed signal; and a multiplier electrically connected to said adder and said speed estimator to multiply the rotational speed signal and the torque signal to create a power signal to be output by said speed controller such that said speed controller maintains the rotational speed of the alternator based at the predetermined speed on the speed command signal and the torque generated by the turbine.

* * * * *